Feb. 6, 1940.    R. S. ROBERTS    2,189,406
VEHICLE BODY
Filed July 27, 1936
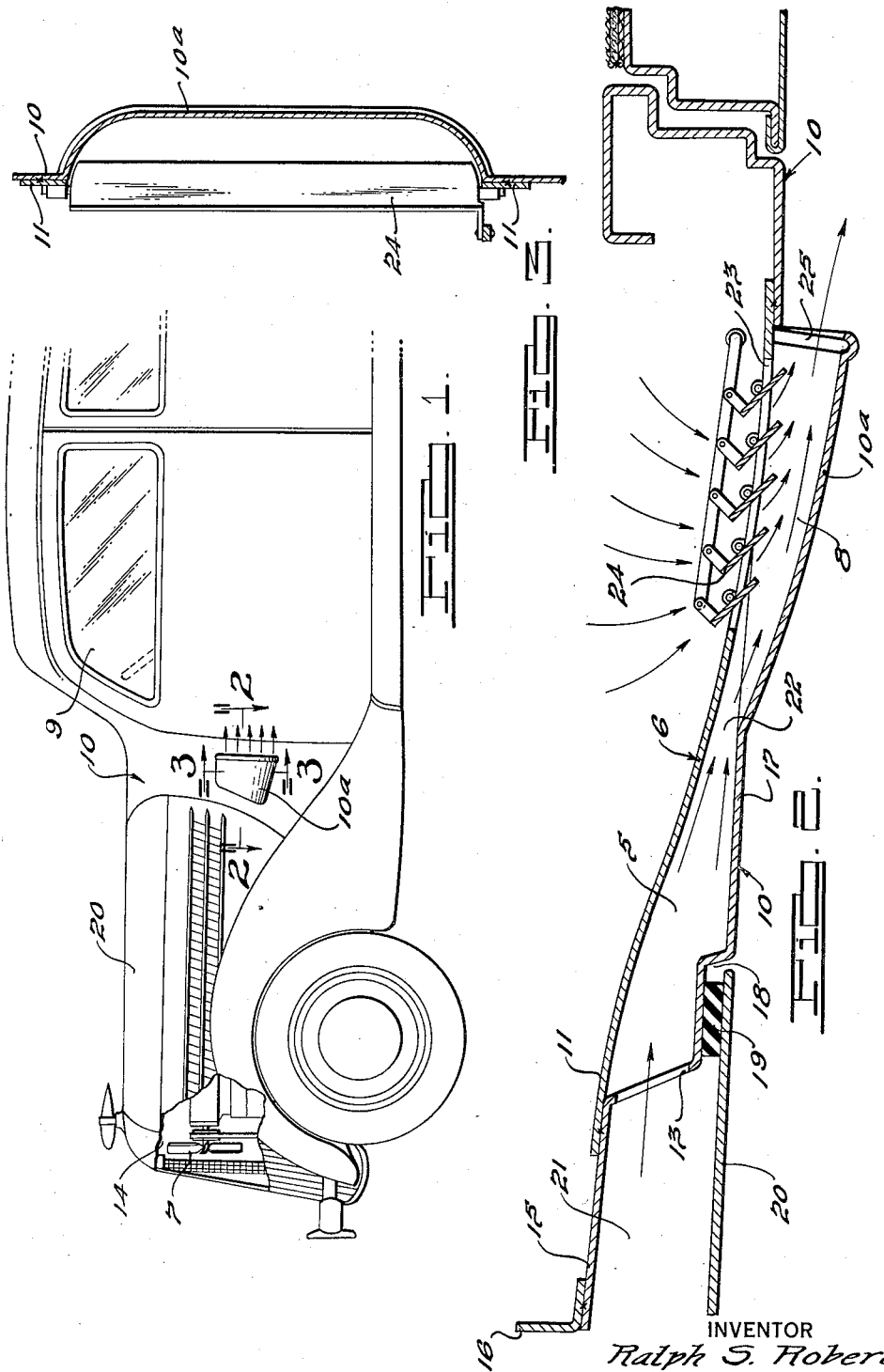
INVENTOR
Ralph S. Roberts.
BY
Dike, Calver & Gray
ATTORNEYS.

Patented Feb. 6, 1940

2,189,406

UNITED STATES PATENT OFFICE 2,189,406

VEHICLE BODY

Ralph S. Roberts, Detroit, Mich., assignor to Briggs Manufacturing Company, Detroit, Mich., a corporation of Michigan Application July 27, 1936, Serial No. 92,833

3 Claims. (Cl. 98—2)

This invention relates generally to vehicle bodies and more particularly to ventilating means for such bodies, particularly for automobile bodies.

One of the objects of the present invention is to provide improved means for withdrawing or exhausting air by suction from the interior of a vehicle body.

Another object of the invention is to provide novel means for creating a predetermined partial vacuum necessary for effecting ventilation of the interior of a vehicle body by utilizing the drop of static pressure in an air stream as the speed of the air therein increases.

A further object of the invention is to utilize the flow of air produced by reason of the operation of the vehicle or its engine for creating a partial vacuum or low pressure zone so as to withdraw air from the interior of the vehicle body.

A still further object of the invention is to increase the efficiency of the ventilation inducing air stream by utilizing the effect of divergency of the discharging conduit.

Other objects of this invention will appear in the following description and appended claims, reference being had to the accompanying drawing forming a part of this specification wherein like reference characters designate corresponding parts in the several views.

Fig. 1 is a side elevation of the front portion of a motor vehicle provided with body ventilating means constructed in accordance with my invention.

Fig. 2 is a fragmentary sectional view of the ventilating means, section being taken on line 2—2 of Fig. 1.

Fig. 3 is a fragmentary sectional view of the Venturi conduit, section being taken on line 3—3 of Fig. 2.

Before explaining in detail the present invention it is to be understood that the invention is not limited in its application to the details of construction and arrangement of parts illustrated in the accompanying drawing, since the invention is capable of other embodiments and of being carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a device for ventilating the interior of a motor vehicle, which device comprises generally a Venturi conduit, the converging portion whereof is disposed in a stream of air produced because of the operation of the engine driven fan of the vehicle, the diverging portion of said conduit communicating with the compartment to be ventilated. The opening effecting said communication is provided with means for regulating the size thereof, and thereby to control the ventilation effect produced.

As illustrated, my novel body ventilating device is shown incorporated into a motor vehicle, the converging portion 5 of the Venturi conduit 6 being disposed in the stream of air produced by the radiator fan 7, while the diverging portion 8 thereof communicates with the passenger compartment 9. Referring more specifically to the drawing, the Venturi conduit is formed in the present embodiment of the invention by the side walls of the cowl 10 and a separate metal sheet or piece 11 secured to said cowl 10. The cowl is shaped out at each side of the vehicle in front of the door, as shown in Fig. 1, to provide the outer walls 10a of the diverging portion 8 of the Venturi conduit. A flat metal plate 11 is secured by spot welding to the inner surface of the cowl at said shaped-out portion and serves as a partition wall to separate said portion from the passenger compartment 9 of the vehicle and to form the inner wall of said Venturi conduit. The front end of the conduit 6 is open as shown at 13 in order to provide communication of said conduit with the engine compartment 14 of the vehicle. The forward inwardly offset portion 15 of the cowl 10, extending forwardly of the opening 13, is secured to the dash 16 while the portion 17 extending rearwardly thereof is offset to form a seat 18 adapted to receive an anti-squeak strip 19 against which rests the hood 20. In the present embodiment of the invention the outside surfaces of the hood 20 and the cowl 10 are co-planar at the strip 19, and the converging portion 5 of the Venturi conduit does not rise above the plane of the cowl.

The hood 20 and the front portion 16 of the cowl 10 form a conduit 21 leading from the engine compartment 14 to the open end 13 of the converging portion 5 of the Venturi conduit and serving to direct the stream of air created by the fan 7 into said converging portion 5.

The diverging portion 8 of the Venturi conduit extends rearwardly from the throat 22 of the conduit 6 and is open at its rearward extremity 25. Thus the air may freely flow from the engine compartment 14 through said Venturi conduit and be discharged through the open end 25 thereof. In flowing through the gradually converging portion 5 of the conduit, the air gradually increases its velocity and consequently its static pressure decreases correspondingly. If, therefore, a communication is established at a suitable locality between the interior of said air stream and a compartment having a substantially atmospheric pressure, there will be induced a flow of air from said compartment to said air stream. If the discharge end of the means effecting such communication is opened rearwardly, the suction effect of the air stream is considerably amplified. In the present embodiment of the invention the communication between the air stream of increased velocity and the passenger compartment 9 is effected by the opening 23 cut in the partition wall 11. Adjustable pivotally mounted louvers or vanes 24 are operatively disposed in said opening for adjusting the size thereof and for regulating thereby the ventilating effect produced, or to prevent any ventilation, if desired. The protruding ends of the adjustable louvers or vanes 24 operate to amplify the suction effect of the air stream.

The velocity of the air and the degree of vacuum therein are greatest at the place of smallest cross section of the conduit, that is to say in the throat 22, increasing the cross section of the diverging portion 8 tending to decrease the suction effect produced. However, since the diverging portion 8 has to discharge the increased amount of air and considering that protruding ends of the louvers decrease the cross sectional area open for the air passage, it will be appreciated that the gradually increasing general cross section of the diverging portion 8 does not necessarily decrease appreciably the velocity of the flowing air. In some instances an increase of the net area of the cross section available in portion 8 for the passage of air from the engine compartment may be intentionally increased, thus effecting a greater discharge of air from said compartment by utilizing the effect of divergency of the discharging means at the expense of throwing some additional load on the fan.

The air exhausted from the passenger compartment 9 is compensated for by the fresh air entering said compartment through any suitable openings, provided preferably in the rear portion of the compartment in order to effect ventilation of the entire compartment.

Thus, considered from one of its broader aspects my invention contemplates providing novel means for ventilating vehicle bodies in which a Venturi conduit is disposed in the stream of air produced by operation of the vehicle, such as in the air stream produced by the radiator fan, and utilizing the suction effect of the stream, as its velocity is increased in said conduit to withdraw the air from the passenger compartment of the vehicle.

I claim:

1. In a motor vehicle having an engine compartment and a passenger compartment, a cowl, a ventilation inducing Venturi conduit formed in part from the material of said cowl and leading from said engine compartment to the atmosphere, the diverging portion of said Venturi conduit communicating with said passenger compartment.

2. In a motor vehicle having an engine compartment and a passenger compartment, a cowl shaped to provide outer walls of a Venturi conduit leading from the engine compartment to the atmosphere, a panel secured to said cowl to form the inner walls of said conduit, an opening being provided in said panel to effect communication between said passenger compartment and the diverging portion of said Venturi conduit.

3. In a motor vehicle having an engine compartment and a passenger compartment, a cowl shaped to provide outer walls of a Venturi conduit leading from the engine compartment to the atmosphere, a panel secured to said cowl to form the inner walls of said conduit, an opening being provided in said panel to effect communication between said passenger compartment and the diverging portion of said Venturi conduit, and means adjustably restricting the size of said opening.

RALPH S. ROBERTS.